United States Patent
Burger et al.

(10) Patent No.: US 8,672,355 B2
(45) Date of Patent: Mar. 18, 2014

(54) FRAME LONGITUDINAL BEAM STRUCTURE FOR CHASSIS FRAMES OF UTILITY VEHICLES, IN PARTICULAR OF TRUCKS AND/OR BUSES

(75) Inventors: Norbert Burger, Ergolding (DE); Andreas Uebelacker, Egenhofen (DE); Harald Boog, Vechelde (DE); Jochen Butscher, Birkenau (DE); Ferdinand Stecher, Steyr (AT)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 13/525,525

(22) Filed: Jun. 18, 2012

(65) Prior Publication Data
US 2012/0319390 A1    Dec. 20, 2012

(30) Foreign Application Priority Data

Jun. 17, 2011 (DE) .......................... 10 2011 104 483

(51) Int. Cl.
*B62D 21/12* (2006.01)
(52) U.S. Cl.
USPC .............................. 280/785; 280/799; 280/781
(58) Field of Classification Search
USPC .......................................... 280/781, 785, 799
See application file for complete search history.

(56) References Cited

U.S. PATENT DOCUMENTS

| | | | | |
|---|---|---|---|---|
| 2,087,255 A * | 7/1937 | Hickman | .................. | 280/788 |
| 2,165,074 A * | 7/1939 | Sherman | .................. | 280/800 |
| 2,366,698 A * | 1/1945 | Cole | .................. | 52/514 |
| 3,188,110 A * | 6/1965 | Wessells, III | .................. | 280/781 |
| 5,611,570 A * | 3/1997 | Garcia | .................. | 280/789 |
| 6,099,194 A * | 8/2000 | Durand | .................. | 403/270 |
| 6,168,226 B1 * | 1/2001 | Wycech | .................. | 296/146.6 |
| 6,189,930 B1 * | 2/2001 | Kalazny | .................. | 280/781 |
| 6,254,132 B1 * | 7/2001 | Lindsay | .................. | 280/789 |
| 6,299,210 B1 * | 10/2001 | Ruehl et al. | .................. | 280/800 |
| 6,398,260 B1 * | 6/2002 | Rinehart | .................. | 280/781 |
| 6,834,887 B2 * | 12/2004 | Burgers | .................. | 280/800 |
| 6,920,721 B2 * | 7/2005 | Johns et al. | .................. | 52/79.1 |
| 7,156,421 B2 * | 1/2007 | Fowler et al. | .................. | 280/781 |
| 7,175,204 B2 * | 2/2007 | Tarbutton et al. | .................. | 280/785 |
| 7,229,098 B2 * | 6/2007 | Mangalaramanan et al. | | 280/781 |
| 7,422,272 B2 * | 9/2008 | Horton et al. | .................. | 296/205 |
| 7,600,785 B2 * | 10/2009 | Ramsey | .................. | 280/781 |

(Continued)

FOREIGN PATENT DOCUMENTS

DE    10 2007 056 404 A1    6/2008
DE    10 2009 041 050 A1    3/2011

*Primary Examiner* — Nicole Verley
(74) *Attorney, Agent, or Firm* — Laurence A. Greenberg; Werner H. Stemer; Ralph E. Locher (57) ABSTRACT

A frame longitudinal beam structure for chassis frames of utility vehicles, in particular for trucks and/or buses, has at least one frame longitudinal beam of modular construction extending in the vehicle longitudinal direction when in the mounted state. The beam has a base profile extending over substantially the entire length of the frame longitudinal beam and having a plate-shaped central web which, as viewed in cross section, extends between opposite frame longitudinal beam regions, such as between upper and lower flanges. The central web is substantially rectilinear along the longitudinal extent of the base profile. Supplemental profiles formed by separate components are attached to the central web in areal abutment. A plurality of supplemental profiles are attached to the central web such that, in the direction of extent of the longitudinal beam, at least two frame longitudinal beam regions of different profile cross section are formed.

36 Claims, 7 Drawing Sheets

(56) References Cited

U.S. PATENT DOCUMENTS

| | | | |
|---|---|---|---|
| 7,717,498 B2 * | 5/2010 | Fleming | 296/203.01 |
| 7,793,981 B2 * | 9/2010 | Xie et al. | 280/785 |
| 7,806,438 B2 * | 10/2010 | Levin et al. | 280/781 |
| 7,862,085 B2 * | 1/2011 | Xu et al. | 280/800 |
| 7,926,848 B2 * | 4/2011 | Sherbeck et al. | 280/800 |
| 8,177,291 B2 * | 5/2012 | Gosolits et al. | 296/193.05 |
| 8,210,603 B2 * | 7/2012 | Favaretto | 296/204 |
| 8,424,913 B1 * | 4/2013 | Schunke et al. | 280/800 |
| 2003/0184075 A1 * | 10/2003 | Freeman et al. | 280/797 |
| 2003/0227164 A1 * | 12/2003 | Young et al. | 280/781 |
| 2006/0108784 A1 * | 5/2006 | Van Der Bijl | 280/800 |
| 2006/0208534 A1 * | 9/2006 | Regnell et al. | 296/187.09 |
| 2007/0194564 A1 * | 8/2007 | Garceau et al. | 280/789 |
| 2008/0122213 A1 * | 5/2008 | Xu et al. | 280/781 |
| 2008/0246263 A1 * | 10/2008 | McPherson | 280/798 |

* cited by examiner

FRAME LONGITUDINAL BEAM STRUCTURE FOR CHASSIS FRAMES OF UTILITY VEHICLES, IN PARTICULAR OF TRUCKS AND/OR BUSES

CROSS-REFERENCE TO RELATED APPLICATION

This application claims the priority, under 35 U.S.C. §119, of German patent application DE 10 2011 104 483.7, filed Jun. 17, 2011; the prior application is herewith incorporated by reference in its entirety.

BACKGROUND OF THE INVENTION

Field of the Invention

The invention relates to a frame longitudinal beam structure for chassis frames of utility vehicles, in particular of trucks and/or buses. The beam structure has at least one frame longitudinal beam of modular construction which extends in the vehicle longitudinal direction when in the mounted state. The frame longitudinal beam has a base profile which extends substantially over the entire length of the frame longitudinal beam and has a plate-shaped central web which, as viewed in cross section, extends between opposite frame longitudinal beam regions, in particular between an upper flange region and a lower flange region of the frame longitudinal beam. The central web runs substantially rectilinearly as viewed in the direction of the longitudinal extent of the base profile. Supplemental profiles formed by separate components are attached to the central web with areal abutment.

The invention also relates to a method for producing a frame longitudinal beam for a frame longitudinal beam structure, in particular for producing a frame longitudinal beam structure as summarized above.

Vehicle chassis, in particular utility vehicle chassis, may be broken down in terms of arrangement and function into the four main assemblies of chassis frame, driver's cab, running gear and drivetrain. Here, the chassis frame is the central load-bearing assembly of the chassis, to which both assemblies of the running gear and also the superstructure are fastened. The same is true for buses if they do not have a self-supporting framework, such as is commonly used nowadays.

In utility vehicle construction, so-called fully bearing chassis frames are normally used in particular for trucks, buses, trailers and/or semitrailers, which are provided with their superstructure in a later assembly step.

The different frame concepts differ with regard to the frame outline, that is to say the arrangement of the load-bearing parts relative to one another, and the profile cross section or the cross-sectional shape of the load-bearing elements. Common chassis frames are designed as ladder frames, which in any case are flexurally rigid and, depending on the shape of the profile cross sections, either torsionally flexible or torsionally rigid. In the case of torsionally flexible chassis frames, the longitudinal and transverse beams are composed of open profiles. In relation to the open profiles, closed profiles with approximately similar overall dimensions are several times more torsionally rigid. Here, the selection of the suitable profile is dependent in particular on the intended purpose of the vehicle, for example whether it is intended for use in off-road or road-going applications, and the torsional rigidity of the superstructure and/or the flexibility of the superstructure fastening.

The vast majority of utility vehicle chassis are designed as torsionally flexible ladder frames composed of C-shaped or U-shaped (hereinafter referred to throughout as C-shaped) frame longitudinal beams with an upright web as a central web. To ensure that the introduction of the vertical forces via the superstructure and the superstructure brackets or the running gear and the corresponding bearing blocks into the chassis frame takes place in the vicinity of the shear centre, the frame longitudinal beams are generally arranged with the opening pointing inward. Among the chassis presently in use, chassis frames are known which have either straight longitudinal beam profiles with a continuously constant cross section, or horizontally or vertically offset profiles, sometimes even profiles with multiple offsets. The production of such frame longitudinal beams generally takes place at special production sites where the starting material is unwound from a so-called coil or winding, is subsequently cut to form blanks and drilled, before the frame longitudinal beam is then provided with its final shape in the press by deformation, kinking and bending. The outlay for the production of the conventional frame longitudinal beams is therefore always very high and expensive, and can take place only in special installations which have large presses capable of imparting pressing forces of up to 50,000 kN or greater and which furthermore have state-of-the-art profiling plants for the rolling and bending of the longitudinal beams.

Aside from classic frame longitudinal beams which each have upper flanges and lower flanges and a vertically arranged web or central web which connects the two flanges, German published patent application DE 10 2007 056 404 A1, for example, also discloses frame longitudinal beams of a chassis frame which are formed by two rails running in the longitudinal direction of the vehicle, which rails are connected to one another in the vertical direction by connecting elements which are suitably differently designed and/or differently bent and offset. The two rails, which in this case form the upper and lower flanges of the frame longitudinal beam, are in each case of U-shaped design, wherein the openings of the rails which are arranged vertically one above one another face towards one another. Provided in each case in the openings, that is to say in the region between the legs of the rails, are fastening surfaces to which the vertically running connecting elements are welded. Such a design is highly complex from a production and manufacturing aspect and requires a large number of different components, which entails high costs. Overall, therefore, this is a modular design of the frame longitudinal beam which is highly complex and therefore, as a whole, less practicable.

Furthermore, United States Patent Application Publication Pub. No. US 2007/0194564 A1 discloses a ladder frame for a vehicle trailer in which the frame longitudinal beams are formed in each case by base profiles which extend substantially over the entire length of the frame longitudinal beam and which run rectilinearly and without an offset, which base profiles are formed with an areal plate-like central web, wherein in each case one leg element is mounted and clamped onto the opposite free ends of the central web, the leg elements forming, at both sides of the central web, an open C-shaped profile region in which the transversely running frame elements of the ladder frame are received and inserted. The mounted profile elements are connected by means of a rivet connection.

Furthermore, commonly assigned, German published patent application DE 10 2009 041 050 A1 discloses a frame longitudinal beam of a utility vehicle in which the upper and lower flanges are formed in each case as a closed hollow profile, wherein in each case one fastening lug projects from the upper flange and from the lower flange in the direction of the in each case other flange, which lug serves for the attachment of a plurality of connecting elements which are spaced apart from one another in the direction of the frame longitudinal beam. The aim of such a modular frame longitudinal beam structure is to save weight and furthermore permit a flexible adaptation of the frame longitudinal beam structure to a wide variety of vehicle types.

It is furthermore generally known to provide, as a chassis frame, a so-called split load-bearing frame in which, in the front vehicle region, that is to say where the assemblies are installed and the driver's cab is arranged, the chassis frame has at the left-hand side and at the right-hand side in each case one frame longitudinal beam formed with a Z profile cross section. The Z profile cross section is adjoined in the rearward direction, towards the rear frame part, by a frame longitudinal beam component which has a conventional C-shape as a profile cross section. Here, the C-shaped rear frame part is screwed to the Z-shaped front frame part in an extremely cumbersome manner by means of a multiplicity of screw connections.

SUMMARY OF THE INVENTION

It is accordingly an object of the invention to provide a frame longitudinal beam structure for chassis frames of utility vehicles, in particular of trucks and/or buses, which overcomes the above-mentioned disadvantages of the heretofore-known devices and methods of this general type and which provides for a frame longitudinal beam structure having a frame longitudinal beam which is of modular construction and which makes it possible for the chassis frames to be adapted flexibly on the whole to a wide variety of vehicle types, furthermore permits a design which is suited to the force flux and has optimized profile cross sections, and furthermore provides a considerable weight saving potential. It is also an object of the present invention to provide a method for producing a frame longitudinal beam and a frame longitudinal beam structure for chassis frames of utility vehicles, in particular of trucks and/or buses, which method is simple and cheap from a production aspect.

With the foregoing and other objects in view there is provided, in accordance with the invention, a frame longitudinal beam structure for a chassis frame of a utility vehicle, such as a truck or a bus. The beam structure comprises:

at least one frame longitudinal beam of modular construction which extends in a vehicle longitudinal direction when in the mounted state, the frame longitudinal beam having a base profile extending substantially over an entire length of the frame longitudinal beam;

the base profile having a plate-shaped central web extending substantially rectilinearly and substantially over an entire length of the frame longitudinal beam;

the plate-shaped central web, as viewed in cross section, extending between mutually opposite frame longitudinal beam regions, such as substantially vertically between an upper flange region and a lower flange region of the frame longitudinal beam; and a plurality of supplemental profiles formed as separate components attached to the central web by way of an areal abutting connection, the supplemental profiles being disposed to form, along an extent of the longitudinal beam, at least two frame longitudinal beam regions with mutually different frame longitudinal beam profile cross sections.

In other words, the objects of the invention are achieved, in accordance with the invention, by providing a frame longitudinal beam structure for chassis frames of utility vehicles, in particular of trucks and/or buses, which frame longitudinal beam structure has at least one frame longitudinal beam of modular construction which extends in the vehicle longitudinal direction when in the mounted state, wherein the frame longitudinal beam has a base profile which extends substantially over the entire length of the frame longitudinal beam and which has a plate-shaped central web which, as viewed in cross section, extends between opposite frame longitudinal beam regions, in particular between an upper flange region and a lower flange region of the frame longitudinal beam, which central web runs substantially rectilinearly as viewed in the direction of the longitudinal extent of the base profile, and to which central web supplemental profiles formed by separate components are attached in areal abutting connection. It is proposed according to the invention that a plurality of supplemental profiles are attached to the central web, which runs substantially rectilinearly and substantially over the entire length of the frame longitudinal beam, of the base profile such that, in the direction of extent of the longitudinal beam, at least two frame longitudinal beam regions of different frame longitudinal beam profile cross section are formed.

With such a modular structure according to the invention, it is for example possible, on the basis of a single base profile with a profile cross section which is substantially continuously constant, to provide a profile cross-sectional geometry which, over the entire direction of extent of the frame longitudinal beam, is precisely adapted to the respective load situation and provides the respectively required geometrical moment of inertia or the respectively required torsional stiffness in an optimized manner precisely where it is required in the respective load situation, thus permitting a tailored frame longitudinal beam design which avoids over-dimensioning, wherein the central web furthermore provides a straight, areal connecting facility for the supplemental profiles. That is to say that, for example proceeding from a base profile with a defined cross section and a defined wall thickness, the supplemental profiles may be arranged and mounted such that these have for example different material or wall thicknesses than the base profile and/or are formed from a different material, for example from a light metal, in order to save weight. Furthermore, with such a modular concept according to the invention composed of a base profile and different supplemental profiles, it is possible to realize frame longitudinal beam fixtures with which it is possible in a simple manner to realize different cross-sectional profiles for example in relation to identical frame longitudinal beam regions on different vehicle types, in particular also by virtue of the fact that the supplemental profiles may, in relation to different vehicle types, be arranged for example at different heights as viewed in the vertical direction, wherein for example the profile cross section itself, for example a Z profile cross section, is otherwise maintained.

Furthermore, it can be ensured with the solution according to the invention that the frame longitudinal beams can be produced with a wall or material thickness which is smaller on the whole than that used for offset, bent conventional frame longitudinal beam fixtures, in the case of which a wall thickness is maintained from front to rear and leads to considerable over-dimensioning in regions. The thinner wall thicknesses which are possible according to the invention furthermore have the advantage that, with such thinner wall thicknesses, it is also possible to provide smaller bend radii, for example in conjunction with the bending process, such as for example rolling, bending or milling, to form the profile legs of the individual components, as a result of which shorter lengths of the profile legs can be realized, and accordingly greater vertical lengths can be obtained in the region of the central web, which is advantageous for example for the areal abutting connection of the supplemental profiles and provides a greater amount of design freedom overall with regard to the attachment of components. The production of the frame longitudinal beam components may furthermore, in terms of manufacturing, be carried out using less technically advanced roller mills, such that production and manufacturing costs can be considerably reduced in this way.

It is expressly pointed out at this juncture that, although the central web or the base profile preferably has a profile cross section which is basically continuously constant in the longitudinal direction in order to provide an areal attachment facility for the supplemental profiles at the attachment regions of the supplemental profiles, the base profile or in particular the central web may self-evidently also be provided with bead-like depressions, protuberances etc. and with recesses, areas of doubled-up material and/or screw holes etc. if necessary. This is then self-evidently preferably done outside the attachment regions of the supplemental profiles, and does not oppose the underlying concept of the invention that a base profile serves as a starting point such that, for different vehicle types of utility vehicles and/or for a wide variety of uses and applications, frame longitudinal beam profile cross sections which vary in each case as viewed over the direction of extent of the frame longitudinal beam and which are optimized precisely for the respective use are provided by virtue of the possibility of combining the base profile with correspondingly provided supplemental profiles, which have a defined cross-sectional profile geometry, in a simple manner in terms of production and manufacturing.

Here, a specific embodiment is particularly preferable in which at least the central web of the base profile which extends in the direction of the frame longitudinal beam is formed without an offset (non-offset or offset-free) in the vertical axis direction of the frame longitudinal beam and/or without a kink (non-kinked or kink-free) transversely with respect to the frame longitudinal beam direction. It is particularly advantageous from a production aspect for preferably the entire base profile to be formed as a simple, non-offset and/or non-kinked profile component which thus runs rectilinearly in the direction of the frame longitudinal beam. It is thereby possible for the frame longitudinal beams to be produced as a whole simply without cumbersome offsetting and bending processes, because the supplemental profiles can be selected such that the desired frame longitudinal beam regions which differ in regions can also be formed without offsetting and kinking of the base profiles. As already stated above, an offset is understood to mean a bend or fold in the vertical axis direction, whereas a kink is understood to mean a bend or fold transversely with respect to the frame longitudinal beam direction.

It is thus particularly preferable for at least the central web of the base profile, preferably the entire base profile, to have a profile cross section which is basically continuously constant as viewed in the direction of longitudinal extent, which however does not rule out the possibility, as already mentioned above, of the central web being provided, preferably outside the attachment region of the supplemental profiles and at defined points, with at least one bead-like stiffening and/or protuberance and/or with at least one recess.

The base profile, preferably a base profile which extends substantially over the entire length of the frame longitudinal beam and which runs rectilinearly and in a non-kinked fashion, is preferably of integral form, in particular is formed from one material and/or in one piece, because the component and therefore also manufacturing outlay can be considerably reduced in this way.

As already indicated above, said supplemental profiles may be fastened to the base profile in various ways. For example, supplemental profiles may be attached in areal abutment to the central web of the base profile on the same side or on different sides as viewed transversely with respect to the direction of the frame longitudinal beam. Alternatively or in addition, supplemental profiles may be attached in areal abutting connection to the central web of the base profile at different heights. Furthermore, supplemental profiles may alternatively or additionally be attached in areal abutting connection to the central web of the base profile so as to be offset by a defined angle with respect to one another in relation to the direction of longitudinal extent of the supplemental profile and the direction of longitudinal extent of the base profile, for example so as to form, together with rectilinear profile components, a frame longitudinal beam region which corresponds to a frame longitudinal beam region produced in a conventional way by means of offsetting and/or kinking. It is self-evident that the supplemental profiles each have, in the direction of the frame longitudinal beam, only such a longitudinal extent as is required to form a desired profile cross section in the respective frame longitudinal beam region, such that the supplemental profiles are generally formed so as to be shorter than the base profile assigned thereto. Here, the areal abutting connection constitutes a particularly stable attachment which makes it possible for the force to be introduced into the respective frame longitudinal beam region without undesired force peaks.

In a particularly preferred refinement with regard to the specific design of the supplemental profiles, it is proposed that at least that profile leg of the supplemental profiles which is attached to the central web of the base profile is formed without an offset in the vertical axis direction and/or without a kink transversely with respect to the direction of the frame longitudinal beam, preferably the entire supplemental profile is formed as a non-offset and/or non-kinked and therefore rectilinearly running profile component. It is thereby possible, as already mentioned above in conjunction with the base profile, for the manufacturing outlay to in turn be considerably reduced, and it is nevertheless possible through corresponding design and selection of the supplemental profiles to realize any desired frame longitudinal beam cross section along the frame longitudinal beam, specifically, as likewise already discussed, in a varied manner along the frame longitudinal beam.

Here, too, it may in turn be provided specifically that at least that profile leg of the respective supplemental profile which is attached to the central web of the base profile, preferably the entire supplemental profile, has a profile cross section which is basically continuously constant as viewed in the direction of longitudinal extent, which however does not rule out the possibility, as already mentioned above, of the supplemental profile being provided, preferably outside the attachment region to the central web of the base profile and at defined points, with at least one bead-like stiffening and/or protuberance and/or with at least one recess.

In a particularly preferred specific embodiment, it is proposed that the base profile has a profile cross section with at least one profile leg which projects at an angle from the central web at least in sections and which, by means of the supplemental profiles, can be supplemented so as to form a profile cross section which encompasses or has a Z shape and a C shape. Particularly preferable here is a structure in which the base profile, at least in a front or rear longitudinal beam frame region in relation to the direction of travel, is supplemented by means of at least one supplemental profile, in particular by means of a single supplemental profile, so as to form a profile cross section which encompasses or has a Z shape, and/or in which the base profile, at least in a front or rear longitudinal beam frame region in relation to the direction of travel, is supplemented by means of at least one supplemental profile, in particular by means of a single supplemental profile, so as to form a frame longitudinal beam having a profile cross section which encompasses or has a C shape, preferably with profile legs which point inward in the vehicle transverse direction when in the mounted state. In this way, a frame longitudinal beam structure is provided which, in conjunction with utility vehicles, in particular with trucks and here in particular with heavy goods vehicles, is advantageously designed optimally with regard to the arrangement of the driver's cab, running gear and drivetrain and/or fixtures and which, for example in the front region, provides a fishbelly geometry without kinks and offsets of the frame longitudinal beam or of the base profile and/or of the supplemental profiles, whereas for example the rear region may have the conventional C-shape with inwardly pointing profile legs as upper and lower flanges.

The expression "profile cross section which encompasses" means here that, for example in conjunction with a profile cross section which encompasses for example a C-shape, this may also include cross-sectional geometries which have for example an E-shape, because a C-shape is also present in said E-shape. A similar situation applies to all other profile cross sections described using the expression "encompasses."

In other words, this means that the base profile may have basically any desired profile cross section, for example an L-shaped or C-shaped or E-shaped or even T-shaped profile cross section, whereas for example the supplemental profiles have a profile cross section which is identical or different in relation to the supplemental profiles and/or in relation to the base profile, and/or may have an L-shaped or C-shaped or E-shaped profile cross section. It could for example be provided that, in a front longitudinal beam frame region in relation to the direction of travel, the base profile, which is C-shaped or E-shaped in cross section, is supplemented by means of at least one supplemental profile so as to form a profile cross section which encompasses or has a Z-shape. It could alternatively be provided that, in a front longitudinal beam frame region in relation to the direction of travel, the base profile, which is T-shaped in cross section, is supplemented by means of at least one supplemental profile so as to form a profile cross section which encompasses or has a Z-shape, and in a rear longitudinal beam frame region in relation to the direction of travel, said base profile is supplemented by means of at least one supplemental profile so as to form a profile cross section which encompasses or has a C-shape. This however results, in particular in conjunction with additional profile legs possibly not required at the respective frame longitudinal beam point, in frame longitudinal beam fixtures which entail a possibly increased material outlay, which may have an adverse effect on costs.

It is accordingly provided, in a particularly preferred specific solution according to the invention, that the base profile has an L-shaped cross section, because in this way, in particular in conjunction with a supplemental profile which for example likewise has an L-shaped cross section, it is possible for the generally desired and required Z profile and C profile cross sections to be formed at the different points of the frame longitudinal beam in the direction of extent of the frame longitudinal beam. Furthermore, the profile leg which projects away from the central web then already forms, depending on the installation position, at least one partial region of the generally provided upper flange and/or lower flange. Particularly preferable is a specific design in which the base profile and/or the supplemental profile have/has an L-shaped cross section, because it is then basically possible for identical parts to be used.

In a further particularly preferred embodiment, it is provided that supplemental profiles overlap one another at least in regions in a central longitudinal beam frame region, which is situated between the front and the rear longitudinal beam frame region, as viewed in the direction of the frame longitudinal beam, preferably overlap one another at least in regions on opposite sides of the central web. Such an overlap in the frame longitudinal beam longitudinal direction permits a smooth transition with regard to the strength of the frame longitudinal beam in said region.

In this connection, it is furthermore particularly advantageous for the supplemental profiles which are attached to opposite sides of the central web to project upward or downward beyond the central web as viewed in the vertical axis direction in such a way that the supplemental profiles bear against one another in areal abutting connection with in each case one of their profile legs in the region of overlap of the supplemental profiles, and/or for the further profile legs of the supplemental profiles to point in the opposite direction in relation to the central web. As a result of the areal abutment of the supplemental profiles, which project beyond the base profile, in the region of overlap, a particularly stable attachment of the supplemental profiles to the base profile is ensured in a simple manner, such that in said region, the frame longitudinal beam is of optimized design with regard to force flux and has high strength and moment of inertia values, which are advantageous in particular if the region of overlap lies in a particularly highly loaded region of the chassis frame or of the frame longitudinal beam structure of the chassis frame. It is self-evident that, here, the supplemental profiles situated on opposite sides may on the one hand be arranged approximately at the same height so as to then form an upper T profile in said region of overlap for example in conjunction with an L profile cross section of the supplemental profiles. It is however likewise possible for the supplemental profiles to be arranged at different heights, in relation to the vertical direction, with regard to the profile legs projecting from the central web, so as to yield a stepped arrangement of the supplemental profiles in the region of overlap. As already discussed, this is dependent on the respective usage and application situations and/or on the respective loading situations. The statements made above illustrate once again that the system according to the invention provides a construction kit for configuring a frame longitudinal beam structure individually optimized for the respective application, such that manufacturing and production costs can be reduced in a simple way by means of this optimized design of the respective frame longitudinal beam fixtures.

In conjunction with the frame longitudinal beam structure in the overlap region as just described, it is furthermore particularly advantageous for at least one of the supplemental profiles to be provided, in the transition region to the profile leg region which projects beyond the central web, with such an angled portion and/or bent portion that the profile leg region which projects beyond the central web is offset by a defined offset distance, in particular by at least a part of the wall thickness of the central web, in the direction of the profile leg region of the associated other supplemental profile in relation to that profile leg region which is attached to the central web. It is thereby possible in a simple manner to ensure the areal abutting connection of the two supplemental profiles in the overlap region and in the region which projects beyond the central web in the vertical axis direction.

The supplemental profiles may basically be connected to the base profile in the conventional way in a positively locking and non-positively locking manner, for example by means of at least one screw and/or rivet connection. According to one particularly advantageous aspect of the present concept of invention, however, it is the intention for the supplemental profiles to be connected to the base profile cohesively, specifically in particular by means of an adhesive connection. It would be particularly advantageous in this connection for the components to be connected to one another to be connected by means of an areal adhesive connection, preferably by means of an adhesive connection which covers the entire abutment and connecting region of the components to be connected to one another with a defined adhesive layer thickness, and which fills out a defined gap spacing between the components to be connected to one another. The gap spacing may be ensured for example by means of spacer elements such as for example balls introduced into the adhesive or pimples pressed into the connecting region, etc. This yields a range of advantages:

The adhesive connection, like a non-positively locking connection, for example a screw connection or a rivet connection, can ensure high-strength component fixing which meets the respective requirements, wherein furthermore the natural frequency and frame elasticity can be influenced by means of the adhesive layer thickness. Furthermore, through the use of adhesive technology, it is possible to attain a considerable weight saving, because it is possible to dispense with a multiplicity of screw and/or rivet connections, which generally make a considerable contribution to the high weight of the frame fixtures. In particular, the advantage is attained here that, even if a positively locking and/or non-positively locking connection is combined with an adhesive connection, it is still possible in any case, like before, to dispense with a large number of screw and rivet connections. The use of the adhesive connection furthermore makes it possible in a simple manner to use a mixture of materials, because the adhesive layer keeps the otherwise differently corrosion-susceptible components spaced apart from one another, such that for example conventional steel materials, for example in the region of the base profile, can be combined in a simple manner with light metal materials of the supplemental profiles, without the possibility of contact corrosion occurring.

A further particular advantage of adhesive bonding can be seen in the fact that the connecting points can be highly effectively hermetically sealed off by means of the adhesive bond, which is likewise of great significance with regard to corrosion prevention.

A further significant advantage of the solution according to the invention can be seen in the fact that, if using adhesive technology, the hardening of the adhesive connection can furthermore provided in any case, in particular during the course of a cathodic dip painting coating process.

The adhesive is preferably applied as a liquid adhesive, though could basically also be formed by an adhesive strip.

According to an aspect of the invention which is particularly advantageous in this regard, it is proposed that the components to be connected to one another are furthermore connected in the adhesive connection region by means of at least one positively locking and/or non-positively locking connection, in particular at least one screw connection, which provides component pre-fixing before the hardening of the adhesive connection. Said connection could basically also be removed again after the hardening. It is however particularly advantageous if the at least one non-positively locking connection which permits the component pre-fixing until the hardening of the adhesive connection simultaneously serves to fix at least one add-on part and/or assembly to the frame longitudinal beam and/or to the frame longitudinal beam structure. Particularly advantageous function integration can be attained in this way, because the connecting elements, which must be provided in any case, for the add-on parts can simultaneously serve as fixing and/or reference points for precise relative positioning of the components to be connected to one another by means of the adhesive connection. Here, said additional non-positively locking connections furthermore provide support for the adhesive connection, resulting in particularly high-strength, secure connections between the individual components.

The solution according to the invention therefore basically permits, in a very general sense, the use of lightweight design and adhesive technology in conjunction with frame longitudinal beam fixtures of utility vehicles, which yields the numerous advantages already described above with regard to weight, costs, force flux etc. and permits an individual and simple adaptation of the respective frame longitudinal beam geometries to the respective application and usage situations, taking an identical base profile as a starting point.

By means of the solution according to the invention, it is thus possible to realize very small material thicknesses of less than 12 mm, in particular of less than 10 mm, for example wall thicknesses of 3 to 5 mm, both on the base profile and also on the supplemental profile or on the supplemental profiles. Conventional values are in particular 8 mm, in heavy goods vehicles 10 mm or 12 mm, and in lighter vehicles 7 mm.

The solution according to the invention furthermore makes it possible, if necessitated by the respective usage or loading situations, for the base profile and/or the supplemental profiles to be reinforced at defined regions, in particular at defined regions of the profile leg which projects away from the central web region, by means of at least one reinforcement element, in particular in the form of an area of doubled-up material. This may be realized for example by means of at least one separate component as a reinforcement element, for example a strip-shaped and/or plate-shaped or else profiled, for example L-shaped component, which is connected to the base profile and/or to the respectively associated supplemental profile in a non-positively locking manner by means of a screw and/or rivet connection and/or by means of an adhesive connection. The reinforcement element may however also alternatively be formed by a bent portion and/or flanged portion of a free profile leg end region of a profile leg of the base profile and/or of at least one supplemental profile. The reinforcement may however also be formed integrally on the respective profile component, for example by virtue of the respective profile component being correspondingly rolled with different wall thicknesses, for example in the manner of a tailored blank component.

With the above and other objects in view there is also provided, in accordance with the invention, a method of producing a frame longitudinal beam for a frame longitudinal beam structure, the beam structure having at least one frame longitudinal beam of modular construction configured to extend in a vehicle longitudinal direction when mounted in a vehicle, and the frame longitudinal beam having a base profile and at least one supplemental profile formed by a separate component attached to the base profile with in areal abutment. The novel method, which is particularly suited for producing a frame longitudinal beam structure as outlined above, comprises:

connecting the at least one supplemental profile to the base profile by way of an adhesive connection and additionally by way of at least one non-positively locking and/or positively locking connection (e.g., a rivet connection and/or a screw connection);

aligning the components to be connected to one another and prefixing them in a positionally accurate manner by way of the at least one non-positively locking and/or positively locking connection until the hardening of the adhesive connection takes place.

In other words, the method is for producing a frame longitudinal beam structure, having at least one frame longitudinal beam of modular construction which extends in the vehicle longitudinal direction when in the mounted state, wherein the frame longitudinal beam has a base profile, preferably a base profile which extends over the entire length of the frame longitudinal beam, to which base profile a supplemental profile formed by a separate component is attached in areal abutting connection. According to the invention, the at least one supplemental profile is connected to the base profile by means of an adhesive connection and additionally by means of at least one non-positively locking and/or positively locking connection, in particular by means of at least one rivet and/or screw connection, wherein the components to be connected to one another are aligned and/or pre-fixed in a positionally accurate manner by means of the at least one non-positively locking and/or positively locking connection until the hardening of the adhesive connection takes place.

The advantages yielded by the method implementation according to the invention have already been explained in detail above in conjunction with the frame longitudinal beam structure, such that in this regard, reference is made to the statements made above.

It is also the case here that the hardening of the adhesive connection is preferably carried out, as already mentioned above, during the course of an electrochemical coating process, in particular a cathodic dip painting process, of the frame longitudinal beam.

It is provided in a further preferred refinement that the at least one non-positively locking and/or positively locking connection which permits the component pre-fixing and/or alignment simultaneously serves to fix at least one add-on part and/or assembly to the frame longitudinal beam or to the frame longitudinal beam structure. The advantages resulting from this have also already been mentioned above.

The components to be connected to one another are connected by means of an areal adhesive connection, preferably by means of an adhesive connection which covers substantially the entire abutment and connecting region of the components to be connected to one another with a defined adhesive layer thickness, and/or which fills out a defined gap spacing between the components to be connected to one another, as has likewise already been explained in more detail above.

Furthermore, it is provided in a particularly preferred method implementation that a plurality of supplemental profiles as per the invention aspect already discussed in detail above in conjunction with the frame longitudinal beam structure are attached to a central web, which extends between opposite frame longitudinal beam regions, in particular between an upper flange region and a lower flange region of the frame longitudinal beam, of a base profile such that at least two frame longitudinal beam regions of different frame longitudinal beam profile cross section are formed in the direction of extent of the longitudinal beam. With regard to the advantages yielded by this, reference is again made to the statements made above.

Finally, there is also provided, in accordance with the invention, a frame longitudinal beam produced by means of the method implementation according to the invention.

Other features which are considered as characteristic for the invention are set forth in the appended claims.

Although the invention is illustrated and described herein as embodied in a frame longitudinal beam structure for chassis frames of utility vehicles, in particular of trucks and/or buses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
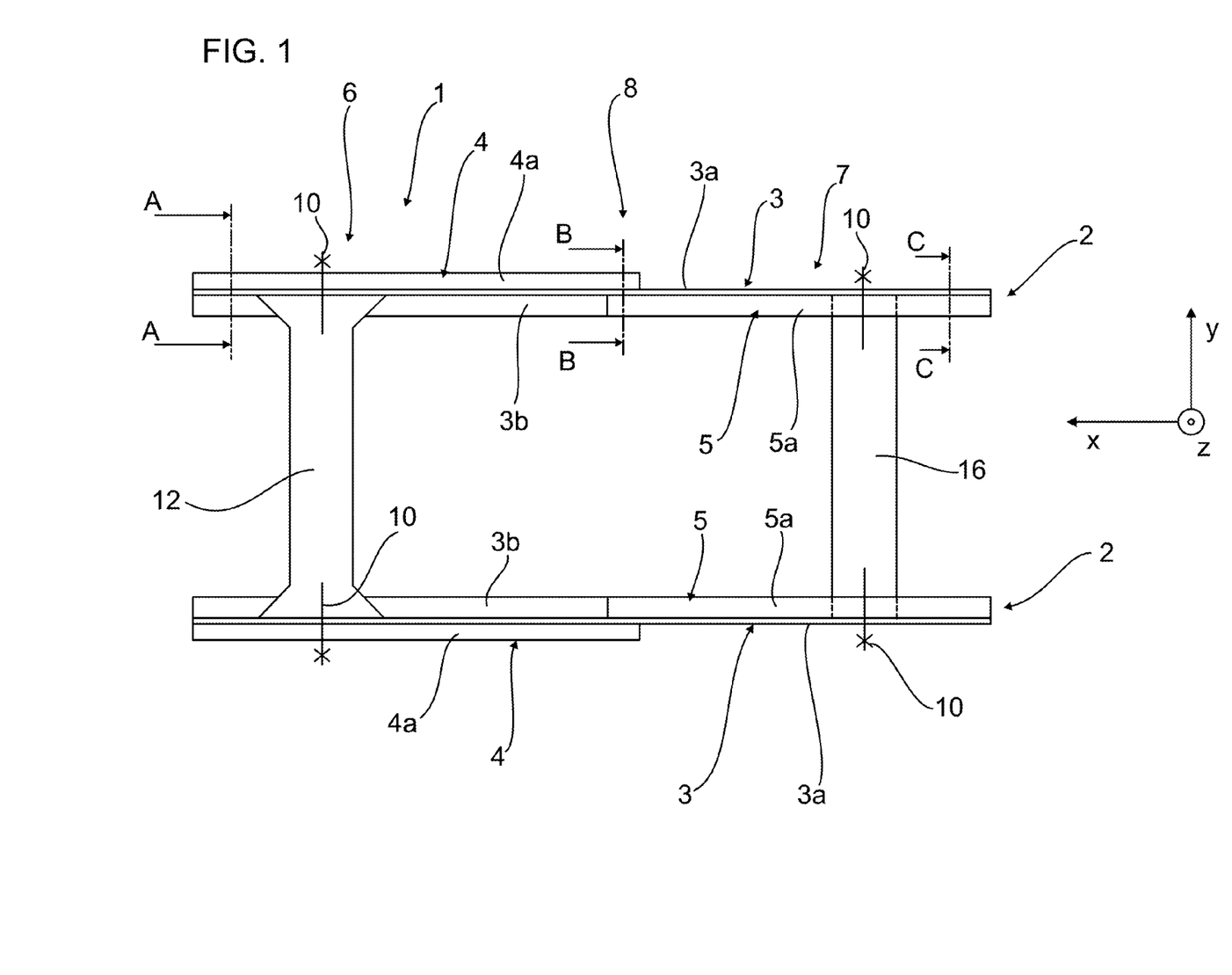
FIG. 1 schematically shows a merely diagrammatic illustration and plan view of a frame longitudinal beam structure of a chassis frame of a utility vehicle, for example of a truck or a bus.

Referring now to the figures of the drawing in detail and first, particularly, to FIG. 1 thereof, there is shown a plan view of a frame longitudinal beam structure 1 of a chassis frame of a utility vehicle, for example of a truck or a bus, which frame longitudinal beam structure has two frame longitudinal beams 2 of modular construction which are spaced apart from one another and which run substantially parallel to one another and which, in the mounted state shown here, run in the vehicle longitudinal direction X and which, in the example shown here, are of identical design, though this need not imperatively be the case.

Figure 3:
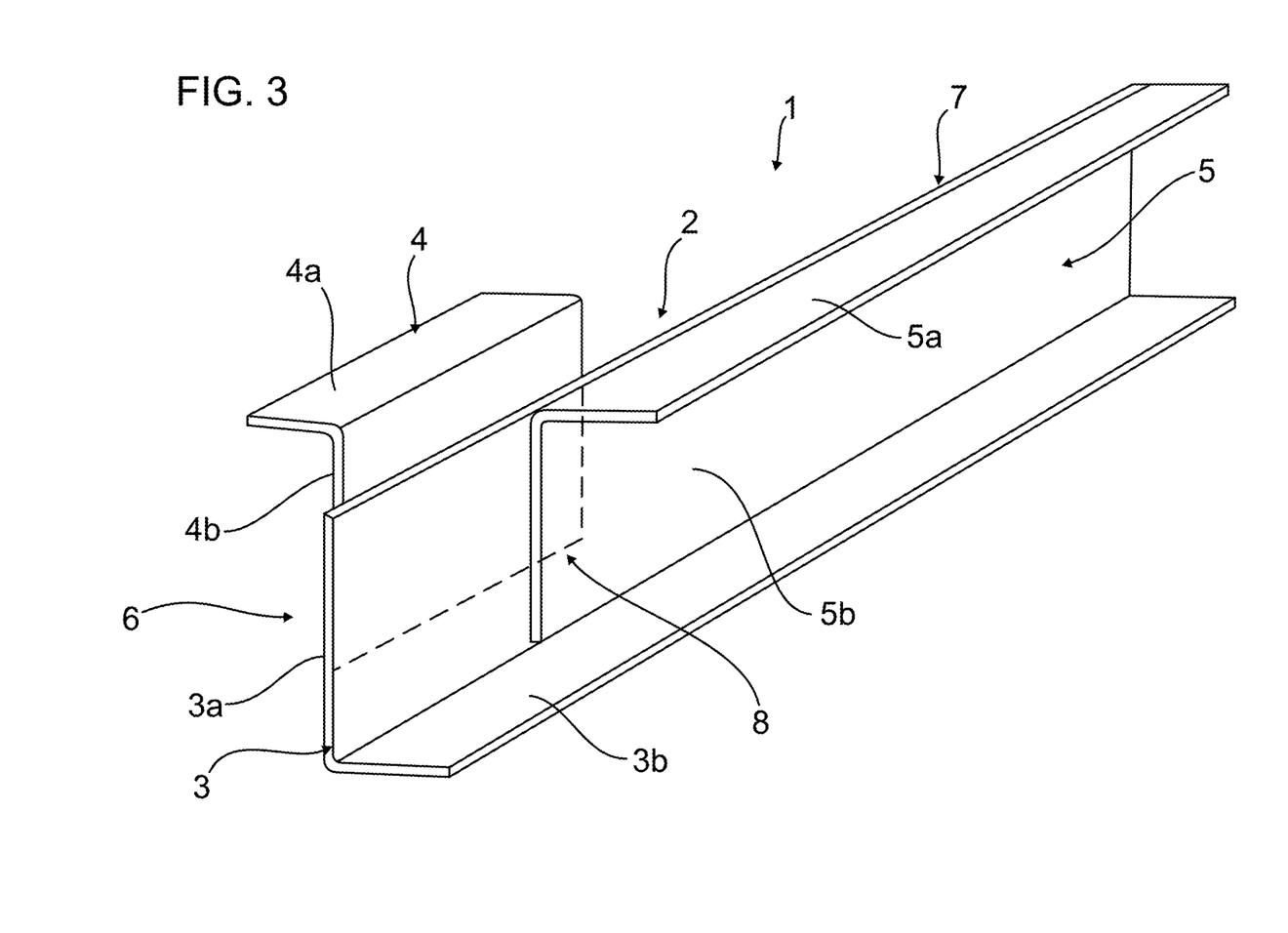
FIG. 3 schematically shows a perspective overview illustration of a frame longitudinal beam.

As can be seen in particular also from a juxtaposition of FIGS. 1 and 3 (FIG. 3 schematically shows one of the two frame longitudinal beams 2 in a diagrammatic perspective illustration), the frame longitudinal beams 2 each have a base profile 3 which has a profile cross section which is L-shaped in this case, which base profile extends substantially over the entire length of the frame longitudinal beam 2 and is furthermore of rectilinear and non-offset design, such that the L-shaped base profile has a continuously constant profile cross section.

Specifically, the base profile 3 here has a central web 3a which extends upward in the manner of a web and substantially in the vehicle vertical axis direction or in the vertical direction Z (see FIG. 1), on which central web 3a is formed, as a lower flange profile, an L leg 3b which, in the example illustrated here, projects away substantially in the vehicle transverse direction Y. Said L leg 3b points inward in the vehicle transverse direction, this being the case here for both frame longitudinal beams 2, for example.

Figure 2A:
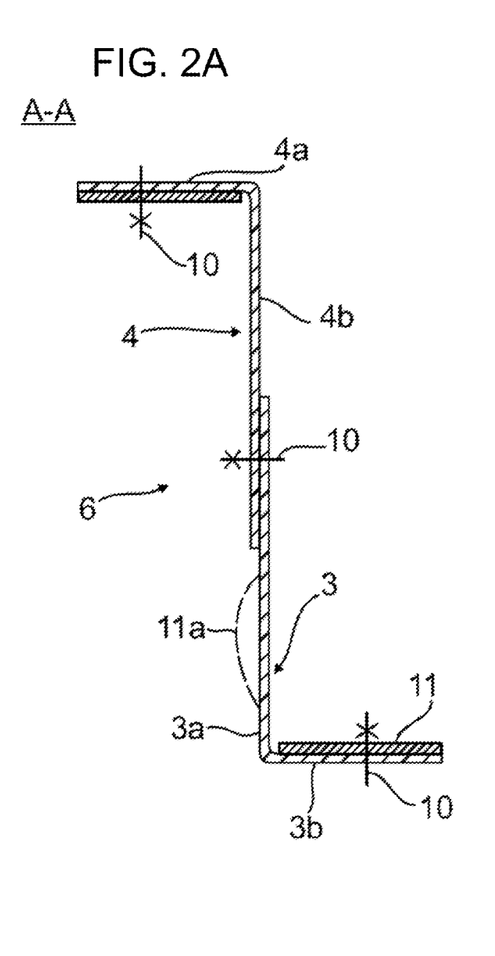
FIGS. 2A to 2C show schematic sectional views along the lines A-A, B-B and C-C in FIG. 1.

As can be seen in particular from FIG. 2a, which shows the section along the line A-A, in conjunction with FIGS. 1 and 3, a front supplemental profile 4 with an L-shaped profile cross section is attached to the central web 3a of the base profile 3, specifically on the outer side of the central web 3a in relation to the vehicle transverse direction Y. Specifically, here, a vertical leg 4b of the front L-shaped supplemental profile 4 is attached in areal abutting connection to the outer side of the central web 3a, preferably, as shown in particular in FIG. 4a, by means of an adhesive layer 9 over the full area as an adhesive connection, and by means of one or more non-positively locking screw connections 10. In the illustration of FIG. 2a, for improved clarity, the adhesive layer 9 is not shown. Likewise, the number of screw connections 10 illustrated in all of the figures should be understood merely as an example for describing the concept of the invention in more detail on the basis of a physical exemplary embodiment.

The front L-shaped supplemental profile 4 furthermore has an L leg 4a which, as viewed in the vehicle transverse direction Y, points outward from the central web 3a and, here, forms an upper flange profile. As a result, there is formed in said front frame longitudinal beam region 6 a profile cross section of the frame longitudinal beam 2 which is Z-shaped overall, as can be clearly seen in particular from FIG. 2a.

If considered necessary for the respective loading situation or usage situation, additional reinforcement elements 11 may be provided on the frame longitudinal beam 2, which reinforcement elements, in the embodiment according to FIG. 2a, are connected in this case in each case as plate-like strips to the L leg 3b of the base profile 3 and to the L leg 4a of the front L-shaped supplemental profile 4 by means of an adhesive connection, for example. Alternatively or in addition, however, the reinforcement elements 11 may also be attached to the respectively associated component by means of a screw connection 10, as is shown likewise merely in highly schematic form in FIG. 2a. The reinforcement element 11 may also be formed, as illustrated by dashed lines in FIG. 2c, by a profile component, in this case an L-shaped profile component.

To reinforce individual frame longitudinal beam regions, in particular in the case of a thin wall thickness of the base profile 3, for example, it may be provided that defined regions are provided with a bead-like stiffening 11a, which is indicated merely in highly schematic form in FIG. 2a.

Figure 4A:
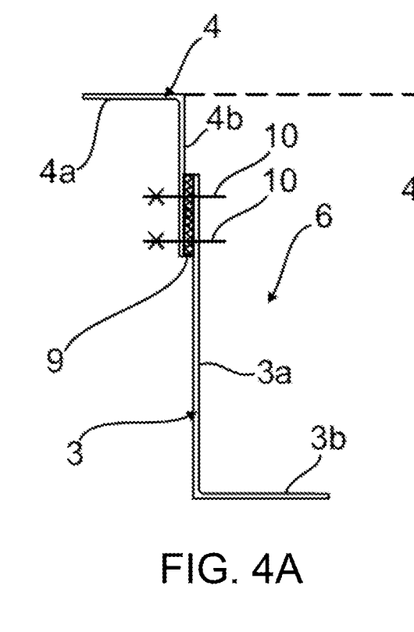
FIGS. 4A to 4B schematically show different possible arrangements of an L-shaped supplemental profile on an in each case identical L-shaped base profile.
Figure 4B:
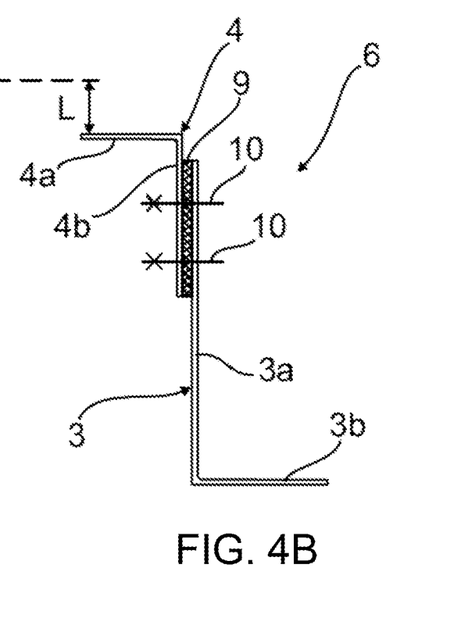

As furthermore emerges in particular from the comparison of FIGS. 4a and 4b, depending on the usage situation and depending on the loading situation and/or depending on the vehicle type, it is furthermore possible for Z-shaped profile cross sections of the frame longitudinal beam 2 which differ in terms of vertical extent to be provided on the basis of a basically identical base profile 3. This may be easily realized, for example for those usage situations in which a profile structure of low height in the vertical axis direction Z is required, by virtue of the L-shaped supplemental profile 4 being attached to the central web 3a in a correspondingly lower position, as shown by the comparison of FIGS. 4a and 4b. The height offset is denoted here by L. This example, which has been explained here merely by way of example in conjunction with the front frame longitudinal beam region 6, self-evidently also applies to all regions of the frame longitudinal beam 2, in particular also to the rear frame longitudinal beam region 7, which will be described in more detail below in conjunction with FIG. 2c, for example. In conjunction with the embodiments of FIGS. 4a and 4b, it is sought to illustrate merely by way of example and schematically the flexible configuration options that are provided with the modular frame longitudinal beam structure according to the invention. In particular, it is also possible here for the base profile 3 to be formed for example from a different material than the one or more supplemental profiles. It is likewise possible for the base profile and supplemental profiles to have different wall thicknesses or material thicknesses.

Figure 2B:
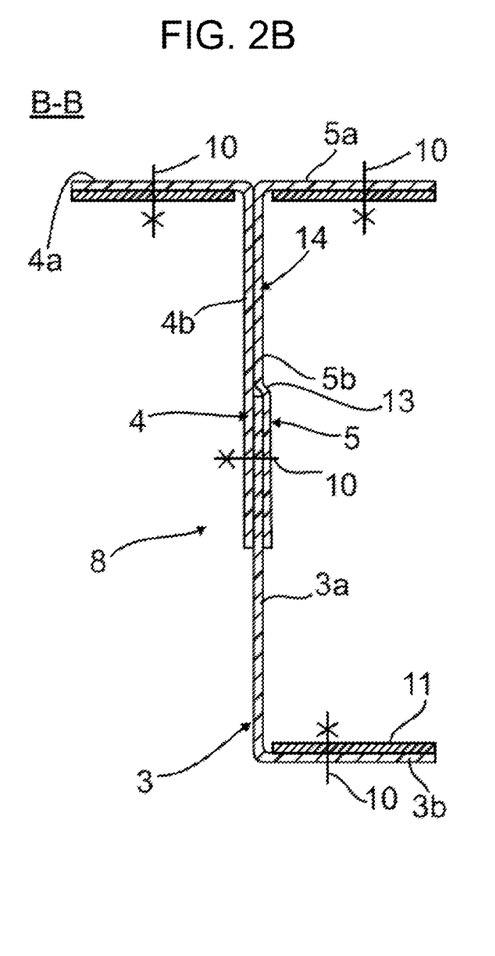

As an alternative to the embodiment as per FIG. 2a, it is furthermore possible (see FIG. 2d), for example if a greater wheel steer angle is desired, to shorten the profile leg 4a shown in FIG. 2a and instead to attach a further L-shaped supplemental profile 4 to the opposite side of the central web 3a, which further L-shaped supplemental profile has a likewise short profile leg 4a and accordingly does not encroach to any great extent on the installation space in the transverse direction. A uniformly rigid profile cross section is thereby provided which can be constructed in an extremely simple manner from multiple profile components, without the need for complex manufacturing machining processes. The construction kit according to the invention thus permits, as is shown by this example which can also be applied analogously to any other region of the frame longitudinal beam, a simple and versatile construction, which satisfies requirements, of a frame longitudinal beam.

Furthermore, it can be clearly seen from FIGS. 4a and 4b that the adhesive layer 9 maintains a defined spacing between the base profile 3 and front L-shaped supplemental profile 4, said spacing being such that, even if different materials are used, contact corrosion is prevented. Depending on the thickness of the adhesive layer 9 used, it is furthermore possible for a certain damping and vibration behaviour of the frame longitudinal beam and therefore of the frame longitudinal beam structure 1 as a whole to be set or predefined.

On the basis of the merely schematic and exemplary attachment of the front L-shaped supplemental profile 4 to the base profile 3, a further particularly preferred embodiment according to the invention can be illustrated by way of a juxtaposition with the schematic illustration of FIG. 1. As can be clearly seen in particular from FIG. 2a and also from FIGS. 4a and 4b, the L-shaped supplemental profile 4 is fixed to the central web 3a of the base profile 3 not only by means of the adhesive layer 9 but also by means of one or more non-positively locking connections, in particular by means of screw connections 10, in order that the components to be connected to one another (base profile 3 and supplemental profile 4) are aligned precisely and positioned with respect to one another, that is to say pre-fixed, before the adhesive layer 9 hardens. The component thus provided with the adhesive layer 9 and which has the screw connections 10 is then coated in the conventional way in a cathodic dip painting process, wherein owing to the high temperatures of the cathodic dip painting process, hardening of the adhesive layer 9 takes place such that the L-shaped supplemental profile 4 is then secured to the base profile 3 twofold, as it were, both by means of the adhesive connection provided by the adhesive layer 9 and also by means of the screw connections 10. It is then possible in this case, for example in the event of failure of one of the attachments, for the other connecting means in each case to continue to perform or assume the load-bearing and connecting function.

Here, the screw connections 10 particularly preferably also constitute the screw connections by means of which a further add-on part of the frame longitudinal beam structure 1, in this case for example a front transverse beam 12, is attached in any case to the opposite frame longitudinal beams 2. Here, the screw connections 10 thus serve, in a dual function, not only for fixing additional add-on parts, such as in this case for example the front transverse beam 12, but also for pre-fixing the one or more supplemental profiles to the base profile 3, before the respective adhesive connection hardens.

It is self-evidently also possible for the adhesive connection to be allowed to harden outside a coating process, which under some circumstances entails increased time expenditure, however.

It is expressly pointed out again at this juncture that the front transverse beam 12 has been selected here merely schematically and by way of an example, and that other component attachment or connecting elements, for example an engine holder, a transmission bracket, a wing, etc., to name but a few examples, may however self-evidently also be used analogously on the frame longitudinal beam structure.

It is expressly pointed out at this juncture that rivet connections may also be provided instead of the screw connections 10. It would likewise basically be possible for purely positively locking connection means, or combined positively locking and non-positively connecting means, to be provided instead of the non-positively locking connecting elements for pre-positioning the supplemental profiles on the base profile 3.

Figure 2C:
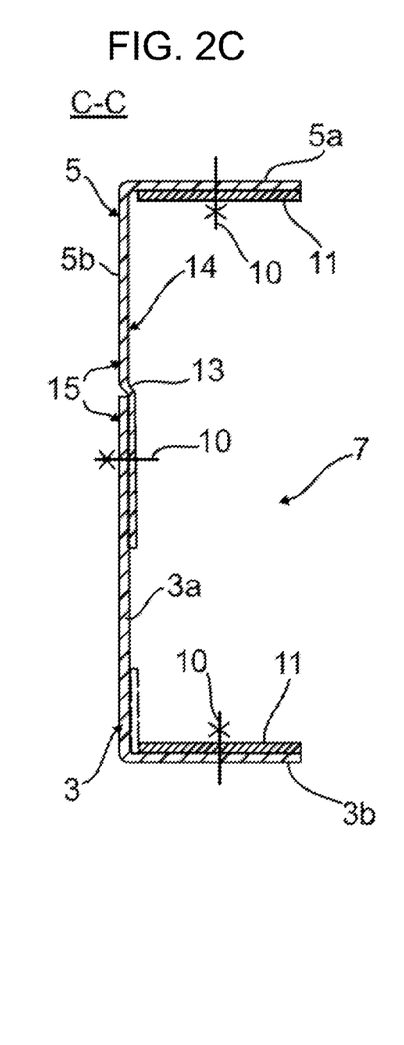
Figure 2D:
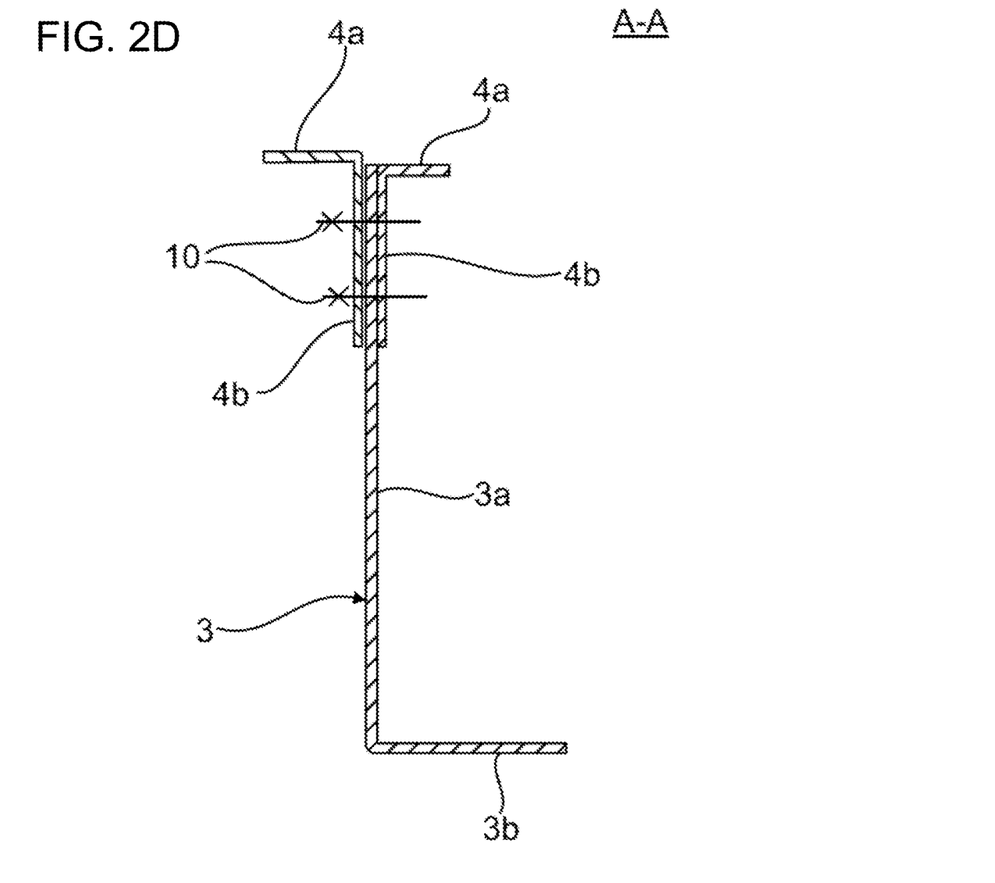
FIG. 2D shows an exemplary alternative refinement of the frame longitudinal beam region of FIG. 2A.

That which has been stated above also applies analogously and figuratively to the rear frame longitudinal beam region 7, in which, as can be seen in particular from FIG. 2c which shows the section C-C from FIG. 1, the base profile 3 has been supplemented by means of a rear L-shaped supplemental profile 5 so as to form a C-shaped profile cross section, the L legs 5a and 3b of which point inward in the direction of the in each case other frame longitudinal beam 2. Here, too, the areal attachment of a vertical leg 5b of the L-shaped supplemental profile 5 to the central web 3a is advantageously realized by means of an areal adhesive connection (not illustrated in detail in FIG. 2c) and by means of a screw connection 10, for example, wherein it is self-evidently also possible for only an adhesive connection or a screw connection (as an example for a non-positively locking connection) to be provided here.

Furthermore, it also emerges from FIG. 2c that it is also possible here, if required, for stiffening reinforcement elements 11 to again be attached or provided in the manner discussed above.

The attachment of the rear L-shaped supplemental profile 5 may basically be realized precisely as illustrated in FIG. 2a in conjunction with the front L-shaped supplemental profile 4, that is to say with a vertical leg 5b which is continuously straight and non-offset in the direction of extent of the frame longitudinal beam. Alternatively, said vertical leg 5b may also be provided, in the transition region to that profile leg region of the vertical leg 5b which projects beyond the central web 3a, with such an angled portion or bent portion 13 that the profile leg region 14 which projects beyond the central web 3a of the base profile is offset by the wall thickness of the central web 3a, in such a way that said projecting profile leg region 14 together with the central web 3a forms a substantially continuous, planar outer surface 15, which is advantageous in particular if, as shown in FIG. 2b which shows the section along the line B-B in FIG. 1, the two L-shaped supplemental profiles 4, 5, which are attached to opposite sides of the central web 3a of the base profile, overlap one another in a central frame longitudinal beam region or overlap region 8 in the direction of extent of the frame longitudinal beam, because it is ensured in this way that the projecting profile leg region 14 of the rear L-shaped supplemental profile 5 also bears in areal abutting connection against the correspondingly associated vertical leg 4b, such that a continuously areal abutting connection of the vertical leg 4b of the front L-shaped supplemental profile 4 both to the central web 3a of the base profile 3 and also to the vertical leg 5b of the rear L-shaped supplemental profile 5 is ensured in the overlap region 8. The connection between the two vertical legs 4b, 5b may basically also take the form of an adhesive connection and/or non-positively locking and/or positively locking connection. It would likewise also be possible for no additional connecting measures to be provided in the region of abutment of the projecting profile leg region 14 against the vertical leg 4b of the front L-shaped supplemental profile 4, but rather for merely an abutting connection of said two leg regions to be ensured in the part which projects beyond the central web 3a of the base profile 3.

Even though it is the case in FIG. 2b that the two L legs 4a and 5a which form the upper flange are situated at the same height, which in conjunction with the embodiment of FIG. 2b corresponds to a T-shaped profile, said two L-shaped supplemental profiles 4, 5 may self-evidently also be staggered with respect to one another in height, as is illustrated schematically and by way of example in FIG. 3.

As has already been mentioned numerous times above, it is possible, both in the central frame longitudinal beam region 8 and also in the rear frame longitudinal beam region 7, for the screw connections provided here by way of example as non-positively locking connections to serve a dual function both for pre-fixing the respective supplemental profile to the base profile 3, specifically until the adhesive layer provided in each case has hardened, and additionally for connecting further components, as shown schematically and by way of example, in conjunction with the rear frame longitudinal beam region 7, by the rear transverse beam 16.

It furthermore emerges from the statements made just above that the base profile 3 which extends substantially over the entire length of the frame longitudinal beam 2 and which runs rectilinearly and without an offset is of integral form, that is to say in particular is formed from one material and/or in one piece, whereas the supplemental profiles extend only over a part of the longitudinal extent of the frame longitudinal beam 2 or of the base profile 3.

Figure 6:
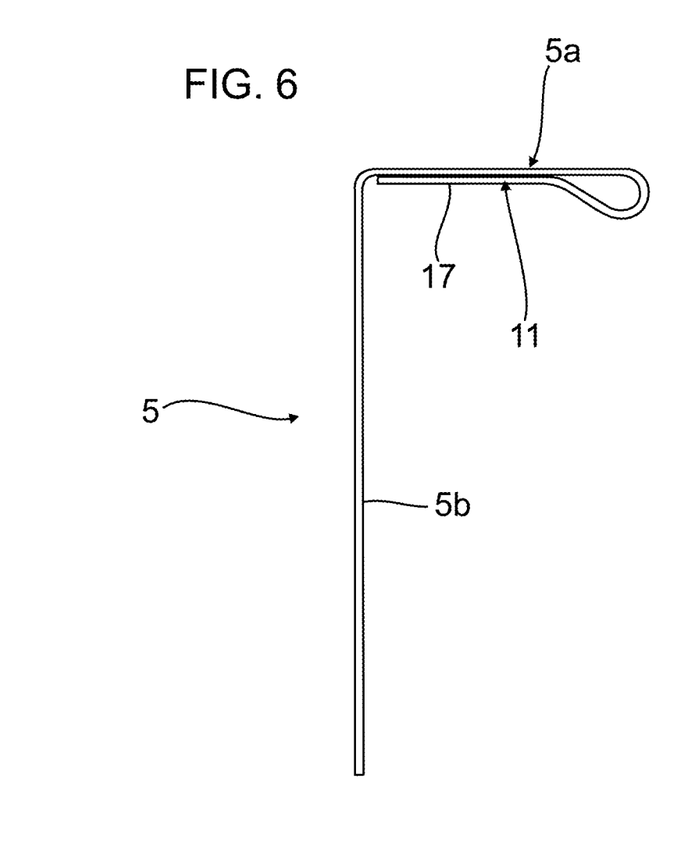
FIG. 6 schematically shows a first refinement of a profile leg, reinforced by flanging, of a supplemental profile which is L-shaped in this case.
Figure 7:
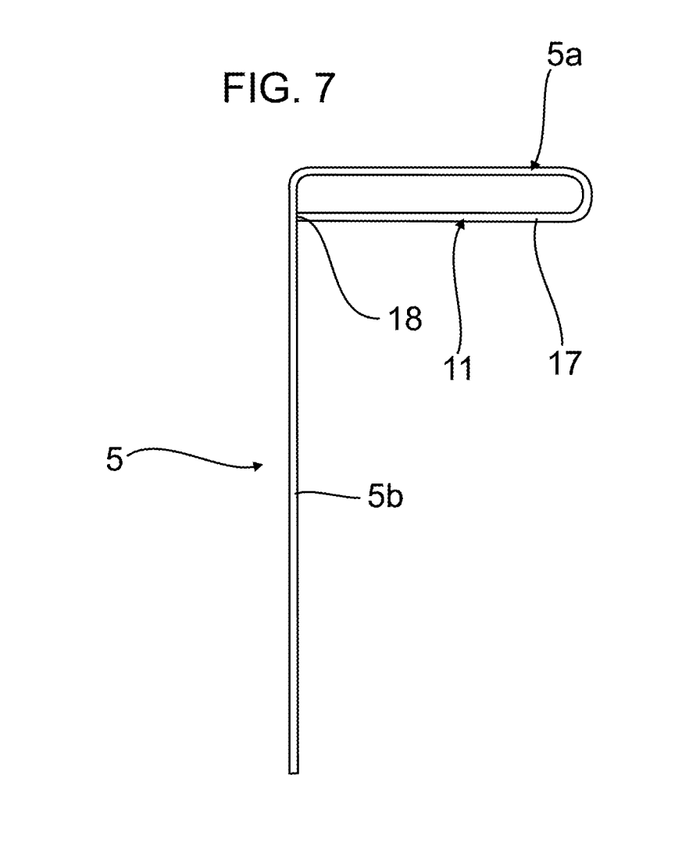
FIG. 7 shows a further refinement, as an alternative to FIG. 6, of a reinforced profile leg of a supplemental profile which is L-shaped in this case.
Figure 8:
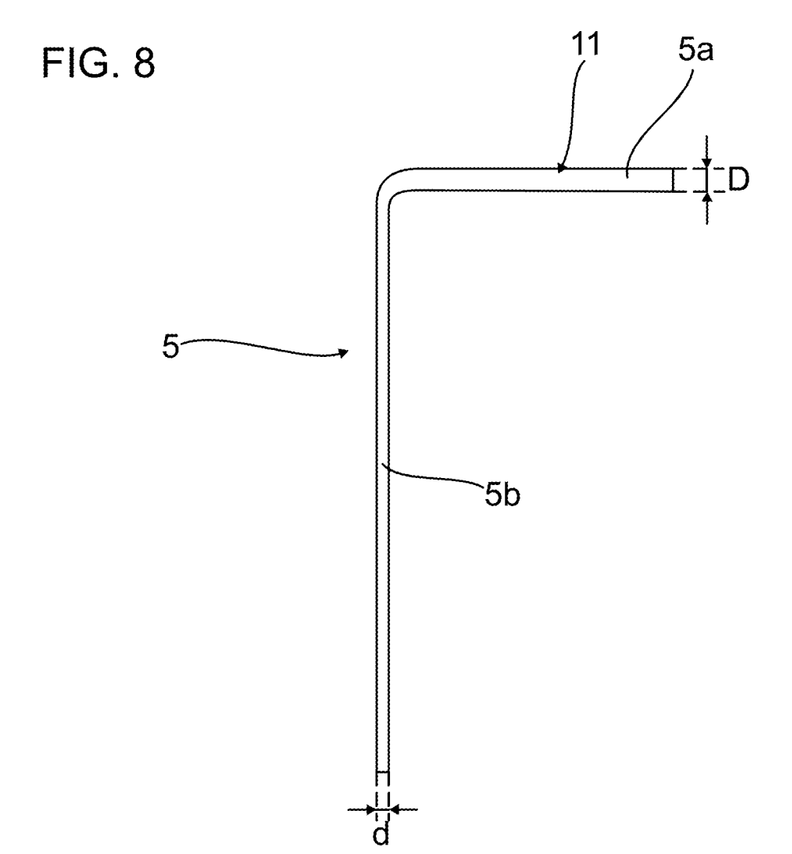
FIG. 8 schematically shows an L-shaped supplemental profile which is produced as a tailored blank and which has different wall thicknesses.

As is illustrated in FIGS. 6 to 8 only on the basis of the rear L-shaped supplemental profile 5, though this could likewise apply to the front L-shaped supplemental profile 4 or to every supplemental profile and/or to every base profile, the reinforcement element 11 may also be realized by a bent portion or flanged portion 17 at the edge of the free end of the L leg 5a. In the embodiment as per FIG. 6, the flanging process has taken place such that the flanged or bent region 17 bears at least in regions in areal abutting connection against the remaining region of the L leg 5a. FIG. 7 illustrates the embodiment in which the flanged or bent region 17 has a defined gap spacing from the remaining region of the L leg 5a. For this purpose, the flanged region 17 is supported here with its free end edge 18 against the vertical leg 5b of the supplemental profile 5.

FIG. 8 finally illustrates a design variant in which the supplemental profile 5 has a significantly thinner material thickness in the region of the vertical leg 5b than the L leg 5a, for example the material thickness d of the vertical leg 5b corresponds to approximately half of the material thickness D of the L leg 5a. The material thickness d of the vertical leg 5b may lie for example in the range between 3 to 5 mm, whereas the material thickness d of the L leg 5a may be approximately between 6 and 8 mm. Such a profile with different material thicknesses may be produced for example in a tailored blank process. In the case of FIG. 8, therefore, in contrast to FIGS. 6 and 7, the reinforcement element 11 is formed not by a flanged region 17 but rather is an integral constituent part of the L leg 5a.

As already mentioned, that which has been stated above is basically applicable to every other supplemental profile and to the base profile 3.

Figure 5A:
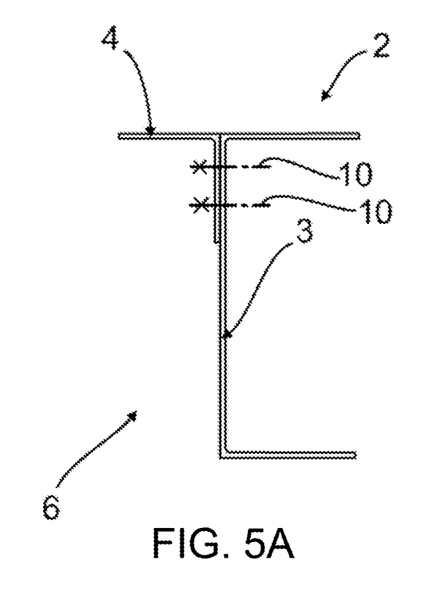
FIG. 5A schematically shows a C-shaped base profile with an L-shaped supplemental profile in a front frame longitudinal beam region.
Figure 5B:
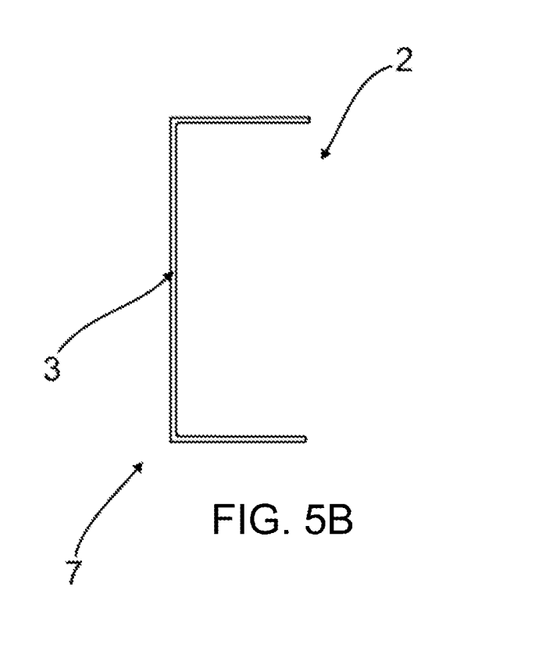
FIG. 5B shows the rear frame longitudinal beam region of the frame longitudinal beam structure of FIG. 5A.

Finally, FIG. 5 also shows yet a further alternative embodiment of the present concept of invention, in which the base profile 3 has a continuously C-shaped profile cross section, such that to form a Z-shaped profile cross section in the front frame longitudinal beam region 6 shown in FIG. 5a, only one L-shaped supplemental profile 4 need be provided, whereas in the rear frame longitudinal beam region 7 illustrated in FIG. 5b, owing to the C-shape of the base profile 3 which is present in any case, no further supplemental profile need be provided. Here, too, the attachment of the L-shaped supplemental profile 4 may be realized, analogously to the way described above, by means of one or more screw connections 10 and/or an areal adhesive connection.

The invention claimed is:

1. A frame longitudinal beam structure for a chassis frame of a utility vehicle, the beam structure comprising:
    at least one frame longitudinal beam of modular construction which extends in a vehicle longitudinal direction when in the mounted state, said frame longitudinal beam having a base profile extending substantially over an entire length of said frame longitudinal beam;
    said base profile having a plate-shaped central web extending substantially rectilinearly and substantially over an entire length of said frame longitudinal beam;
    said plate-shaped central web, as viewed in cross section, extending between mutually opposite frame longitudinal beam regions; and
    a plurality of supplemental profiles formed as separate components attached to said central web by way of an areal abutting connection, said supplemental profiles being disposed to form, along an extent of said longitudinal beam, at least two frame longitudinal beam regions with mutually different frame longitudinal beam profile cross sections, said supplemental profiles overlapping one another at least in regions in a central longitudinal beam frame region, which is situated between a front and a rear longitudinal beam frame region, as viewed in the direction of the frame longitudinal beam, and wherein said supplemental profiles overlap one another at least in regions on opposite sides of the central web.

2. The frame longitudinal beam structure according to claim 1, wherein said central web extends substantially vertically between an upper flange region and a lower flange region of said frame longitudinal beam.

3. The frame longitudinal beam structure according to claim 1, wherein at least said central web of said base profile that extends in the direction of the frame longitudinal beam is formed without an offset in a vertical axis direction and/or without a kink transversely with respect to the direction of the frame longitudinal beam.

4. The frame longitudinal beam structure according to claim 3, wherein the entire said base profile is formed as a non-offset and/or non-kinked profile component which thus runs rectilinearly in the direction of the frame longitudinal beam.

5. The frame longitudinal beam structure according to claim 1, wherein at least said central web, or the entire said base profile, has a profile cross section that is substantially continuously constant as viewed in the direction of longitudinal extent.

6. The frame longitudinal beam structure according to claim 1, wherein said central web is provided, outside an attachment region of said supplemental profiles and at defined points, with one or more of at least one bead-like stiffening, a protuberance, or at least one recess.

7. The frame longitudinal beam structure according to claim 1, wherein one or more of the following is true:
    said supplemental profiles are attached in areal abutment to said central web of said base profile on a same side as viewed transversely with respect to the direction of the frame longitudinal beam;
    said supplemental profiles are attached in areal abutment to said central web of said base profile on different sides as viewed transversely with respect to the direction of the frame longitudinal beam;
    said supplemental profiles are attached in areal abutment to said central web of said base profile at different heights; and/or
    said supplemental profiles are attached in areal abutment to said central web of said base profile so as to be offset by a defined angle with respect to one another in relation to the direction of longitudinal extent of the supplemental profile and the direction of longitudinal extent of the base profile.

8. The frame longitudinal beam structure according to claim 1, wherein at least that profile leg of the supplemental profiles which is attached to said central web of said base profile is formed without an offset in the vertical axis direction and/or without a kink transversely with respect to the direction of the frame longitudinal beam.

9. The frame longitudinal beam structure according to claim 1, wherein at least that profile leg of the respective said supplemental profile which is attached to said central web of said base profile, has a profile cross section which is basically continuously constant as viewed in the direction of longitudinal extent, and/or wherein said supplemental profile is provided with at least one bead-like stiffening and/or protuberance and/or with at least one recess.

10. The frame longitudinal beam structure according to claim 1, wherein said base profile has a profile cross section with at least one profile leg which projects at an angle from the central web at least in sections and which, by way of said supplemental profiles, can be supplemented so as to form a profile cross section which encompasses or has a Z shape and a C shape.

11. The frame longitudinal beam structure according to claim 1, wherein said base profile, at least in a front or rear longitudinal beam frame region in relation to the direction of travel, is supplemented by means of at least one supplemental profile so as to form a profile cross section which encompasses or has a Z shape.

12. The frame longitudinal beam structure according to claim 1, wherein said base profile, at least in a front or rear longitudinal beam frame region in relation to the direction of travel, is supplemented by way of at least one supplemental profile so as to form a profile cross section which encompasses or has a C shape, and with profile legs that point inward in a vehicle transverse direction when in the mounted state.

13. The frame longitudinal beam structure according to claim 1, wherein said base profile has an L-shaped or C-shaped or E-shaped or T-shaped profile cross section and/or wherein said supplemental profiles have a profile cross section which is identical or different in relation to the supplemental profiles and/or in relation to said base profile, and/or in that the supplemental profiles have an L-shaped or C-shaped or E-shaped profile cross section.

14. The frame longitudinal beam structure according to claim 1, wherein said supplemental profiles that are attached to opposite sides of said central web project upward or downward beyond said central web as viewed in the vertical axis direction in such a way that said supplemental profiles bear against one another in areal abutting connection with in each case one of their profile legs in the region of overlap of said supplemental profiles, and/or wherein further profile legs of said supplemental profiles point in the opposite direction in relation to said central web.

15. The frame longitudinal beam structure according to claim 14, wherein at least one of said supplemental profiles is provided, in a transition region to said profile leg region that projects beyond said central web, with such an angled portion and/or bent portion that the profile leg region which projects beyond the central web is offset by a defined offset distance, in a direction of said profile leg region of the associated other supplemental profile in relation to that profile leg region which is attached to said central web.

16. The frame longitudinal beam structure according to claim 1, wherein said base profile is formed integrally in one piece.

17. The frame longitudinal beam structure according to claim 1, wherein said supplemental profiles are connected to said base profile cohesively by way of at least one attachment selected from the group consisting of an adhesive connection, a positively locking connection, a frictional force locking connection, and a screw connection.

18. The frame longitudinal beam structure according to claim 17, wherein the components to be connected to one another are connected by way of an areal adhesive connection.

19. The frame longitudinal beam structure according to claim 18, wherein the components are connected by way of an adhesive connection covering substantially an entire abutment and connecting region of the components to be connected to one another with a defined adhesive layer thickness, and/or which fills out a defined gap spacing between the components to be connected to one another.

20. The frame longitudinal beam structure according to claim 18, wherein the components to be connected to one another are furthermore connected in the adhesive connection region by way of at least one positively locking and/or non-positively locking connection, which provides for component pre-fixing prior to a hardening of the adhesive connection.

21. The frame longitudinal beam structure according to claim 20, wherein the at least one locking connection configured to pre-fix the components until the hardening of the adhesive connection simultaneously serves to fix at least one add-on part and/or assembly to the frame longitudinal beam and/or to the frame longitudinal beam structure.

22. The frame longitudinal beam structure according to claim 1, wherein said base profile and/or said supplemental profiles are reinforced at defined regions.

23. The frame longitudinal beam structure according to claim 22, wherein a reinforcement element is formed by at least one separate component, and/or wherein said reinforcement element is formed by a bent portion and/or flanged portion of a free profile leg end region of a profile leg of said base profile and/or of at least one supplemental profile, and/or wherein said reinforcement element is formed integrally by regions of different thickness of the respective said profile component.

24. The frame longitudinal beam structure according to claim 1, wherein said base profile and at least one of said supplemental profiles and/or at least a part of said supplemental profiles have different material thicknesses from one another, and/or are produced from different materials and/or with different strengths.

25. A utility vehicle, comprising a frame longitudinal beam structure according to claim 1.

26. A method of producing a frame longitudinal beam for a frame longitudinal beam structure according to claim 1, the method which comprises:
   connecting the at least one supplemental profile to the base profile by way of an adhesive connection and additionally by way of at least one non-positively locking and/or positively locking connection;
   aligning the components to be connected to one another and prefixing them in a positionally accurate manner by way of the at least one non-positively locking and/or positively locking connection until the hardening of the adhesive connection takes place.

27. The method according to claim 26, wherein the at least one non-positively locking and/or positively locking connection is selected from the group consisting of a rivet connection and a screw connection.

28. The method according to claim 26, configured for producing the frame longitudinal beam structure according to claim 1.

29. The method according to claim 26, which comprises carrying out the hardening of the adhesive connection during the course of an electrochemical coating process of the frame longitudinal beam.

30. The method according to claim 26, which comprises allowing the adhesive connection to cure while performing a cathodic dip painting process.

31. The method according to claim 26, which comprises forming the at least one locking connection for pre-fixing and/or aligning the components and to simultaneously fix at least one add-on part or assembly to the frame longitudinal beam or to the frame longitudinal beam structure.

32. The method according to claim 26, which comprises connecting the components by way of an areal adhesive connection covering substantially an entire abutment and connecting region of the components with a defined adhesive layer thickness, and/or which fills out a defined gap spacing between the components to be connected to one another.

33. The method according to claim 26, which comprises attaching a plurality of supplemental profiles to a central web of a base profile that extends between opposite frame longitudinal beam regions, to thereby form at least two frame longitudinal beam regions of different frame longitudinal beam profile cross section along an extent of the longitudinal beam.

34. The method according to claim 33, which comprises forming the central web to extend between an upper flange region and a lower flange region of the frame longitudinal beam.

35. A frame longitudinal beam for a utility vehicle, produced by carrying out the method according to claim 26.

36. A frame longitudinal beam structure for a chassis frame of a utility vehicle, the beam structure comprising:

at least one frame longitudinal beam of modular construction which extends in a vehicle longitudinal direction when in the mounted state, said frame longitudinal beam having a base profile extending substantially over an entire length of said frame longitudinal beam;

said base profile having a plate-shaped central web extending substantially rectilinearly and substantially over an entire length of said frame longitudinal beam, said base profile having a profile leg projecting at an angle from said central web;

said plate-shaped central web, as viewed in cross section, extending between mutually opposite frame longitudinal beam regions; and a plurality of supplemental profiles formed as separate components attached to said central web by way of an areal abutting connection, said supplemental profiles each having a respective supplemental profile leg projecting from said central web, said supplemental profiles being disposed to form, along an extent of said longitudinal beam, at least two frame longitudinal beam regions with mutually different frame longitudinal beam profile cross sections due at least in part to differences in each said supplemental profile leg.

* * * * *